June 21, 1966  R. W. DAVIDSON  3,256,772
PHOTOCOMPOSING MACHINE
Original Filed April 15, 1959  7 Sheets-Sheet 1
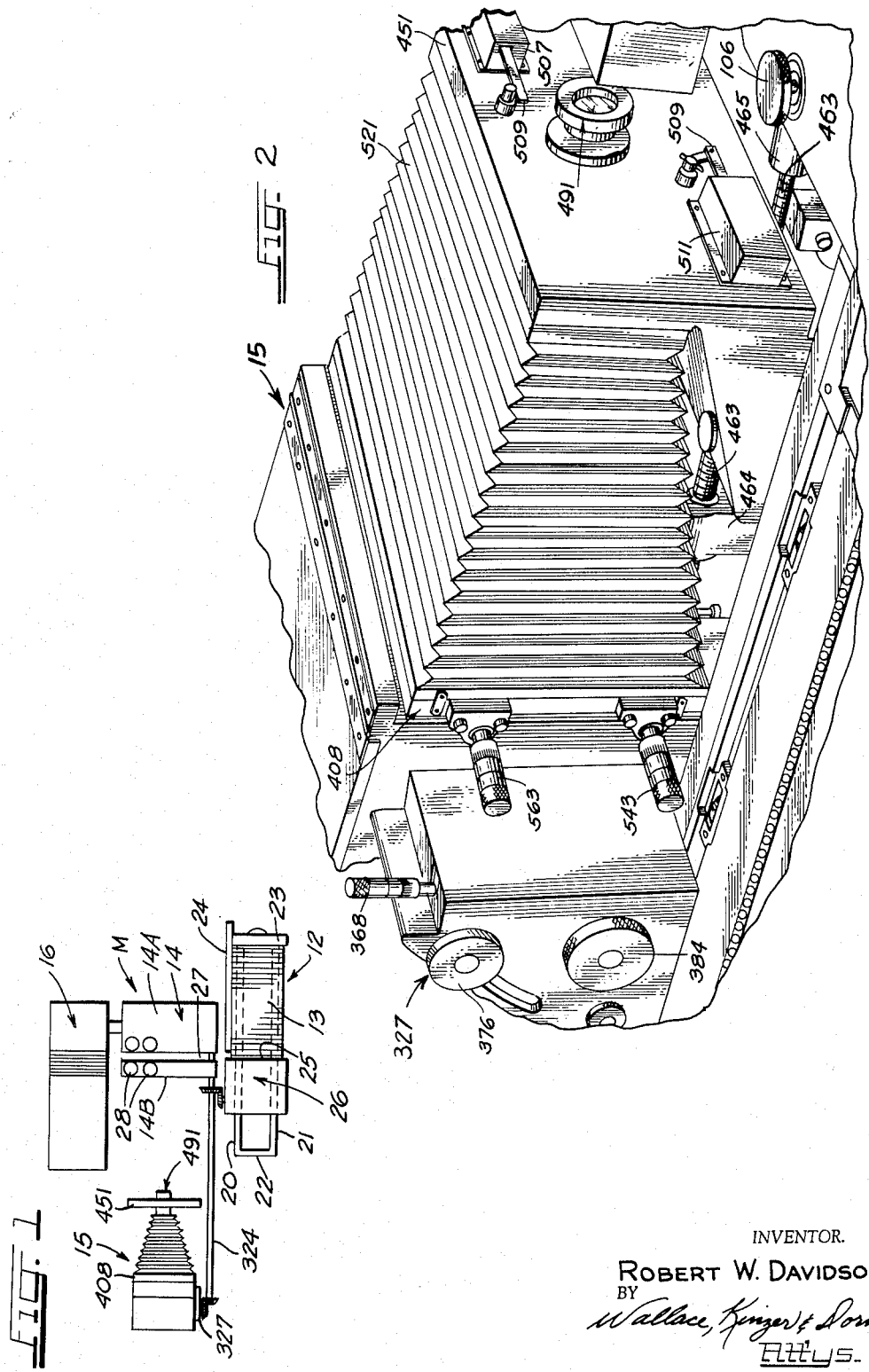
INVENTOR.
ROBERT W. DAVIDSON
BY
Wallace, Kinzer & Dorn
Attys.

June 21, 1966  R. W. DAVIDSON  3,256,772
PHOTOCOMPOSING MACHINE
Original Filed April 15, 1959  7 Sheets-Sheet 2
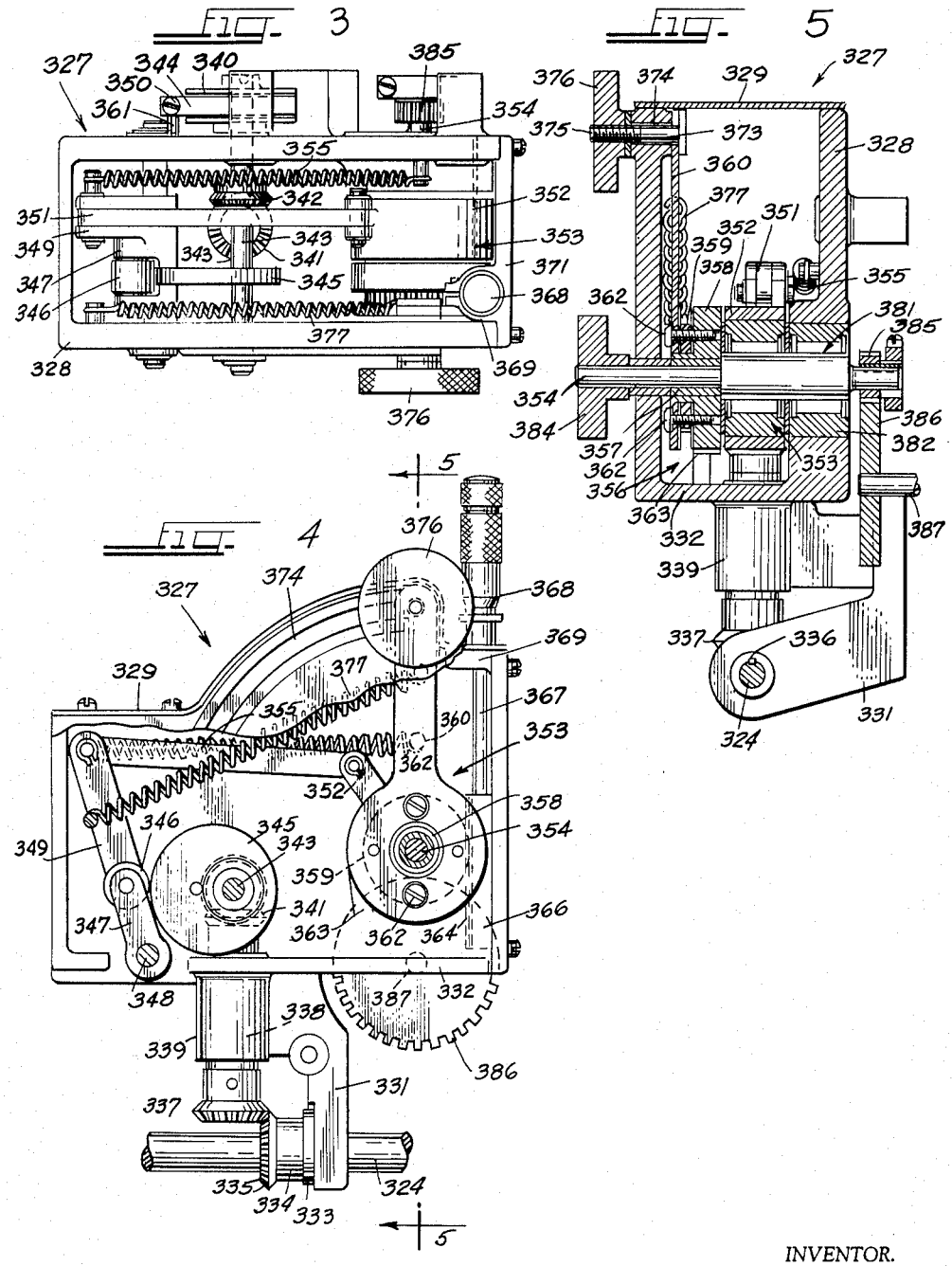
INVENTOR.
ROBERT W. DAVIDSON
BY
Wallace, Kinzer & Dorn
ATT'YS.

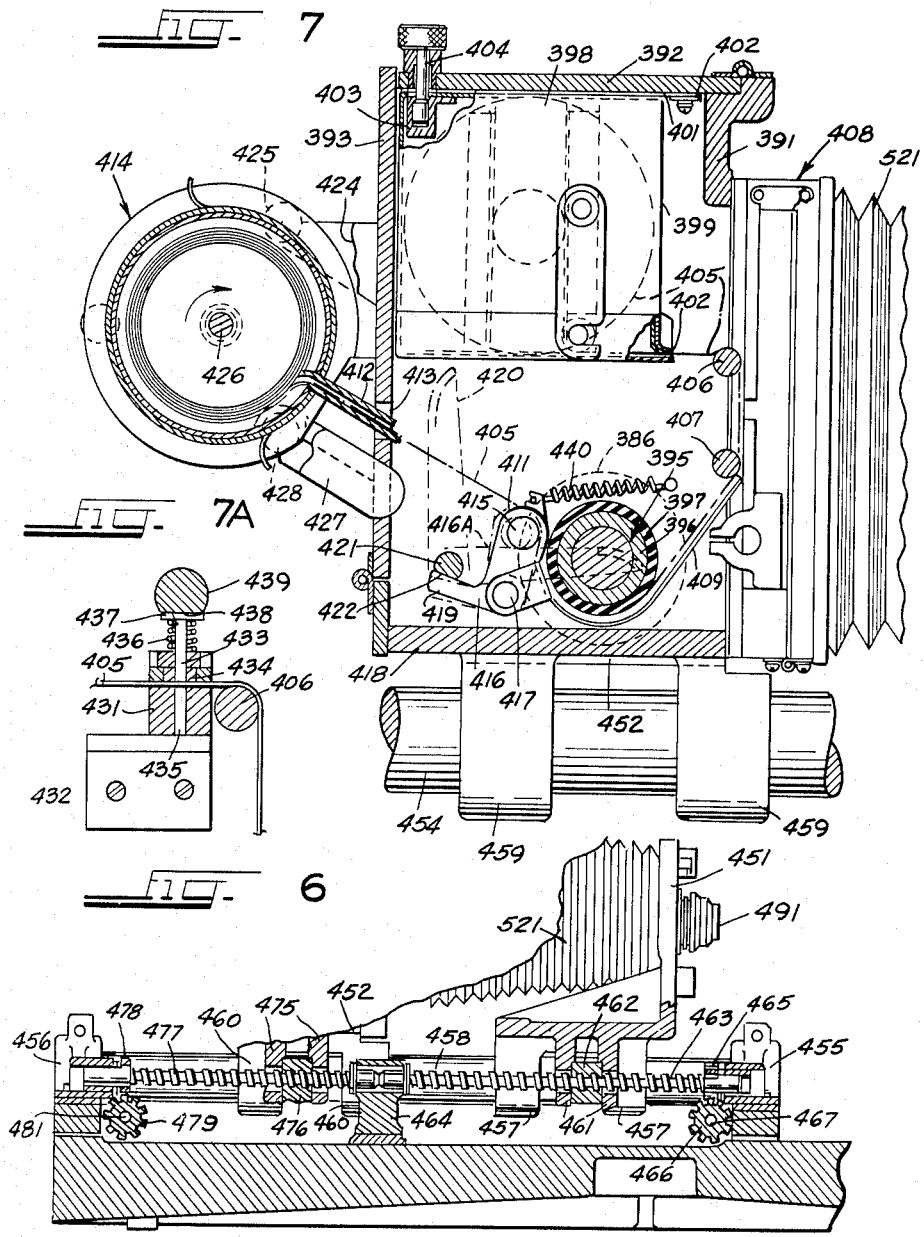

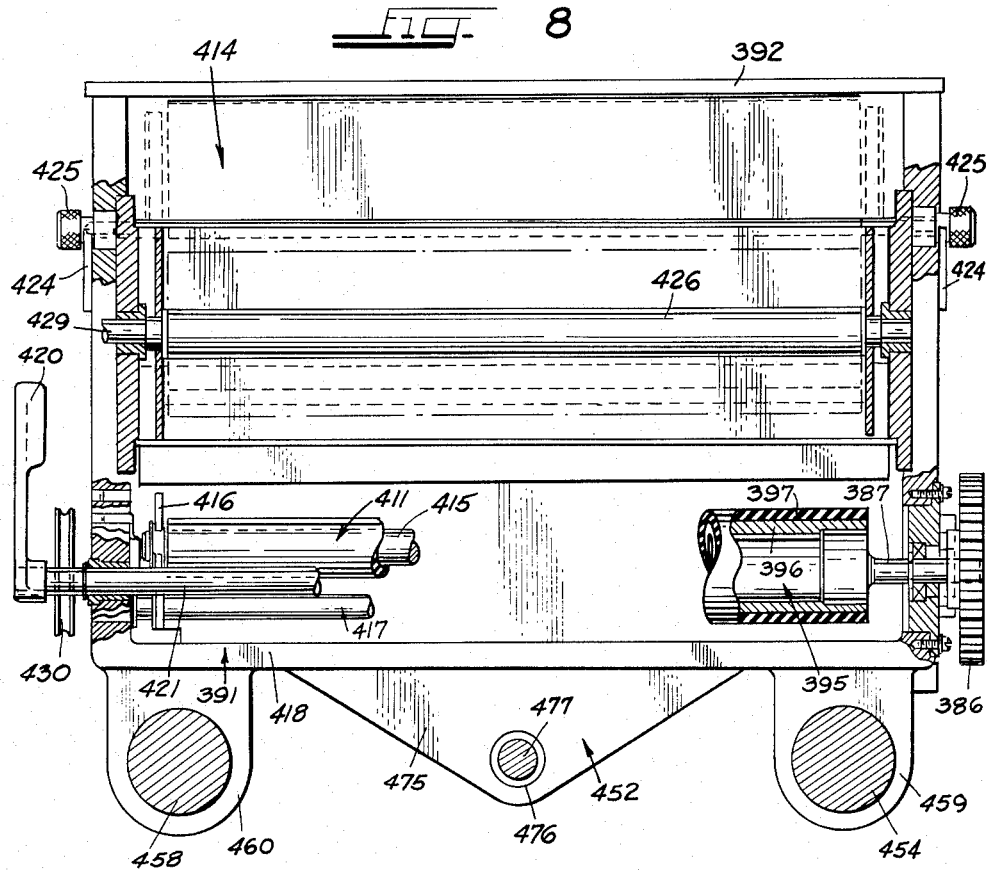
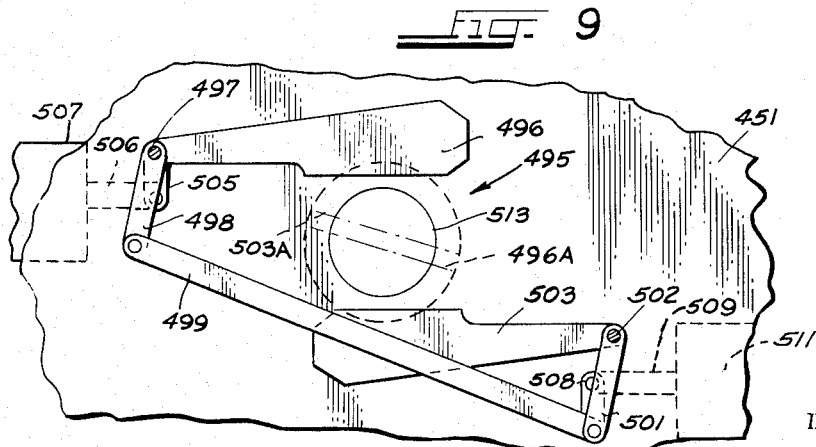

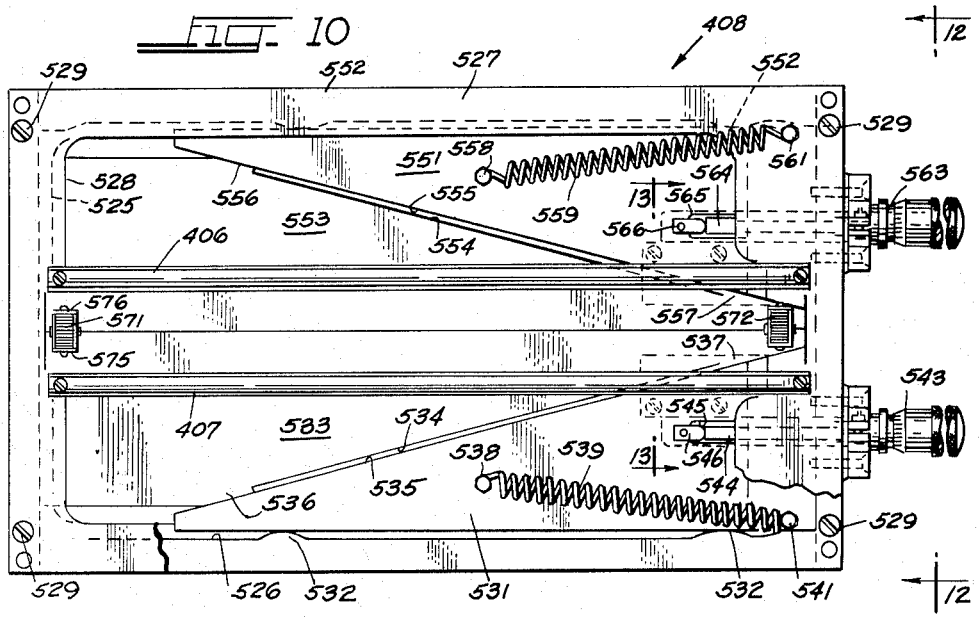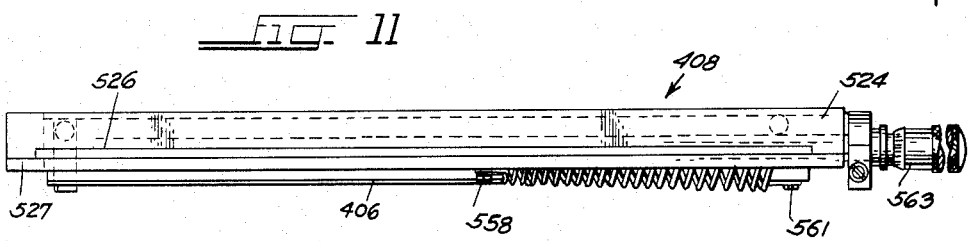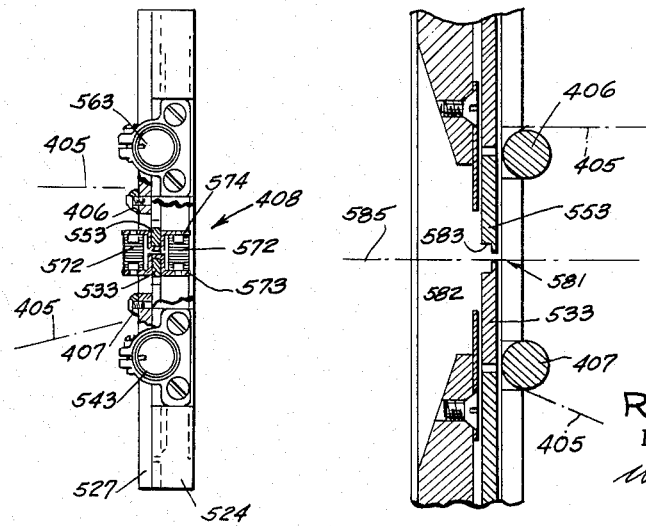

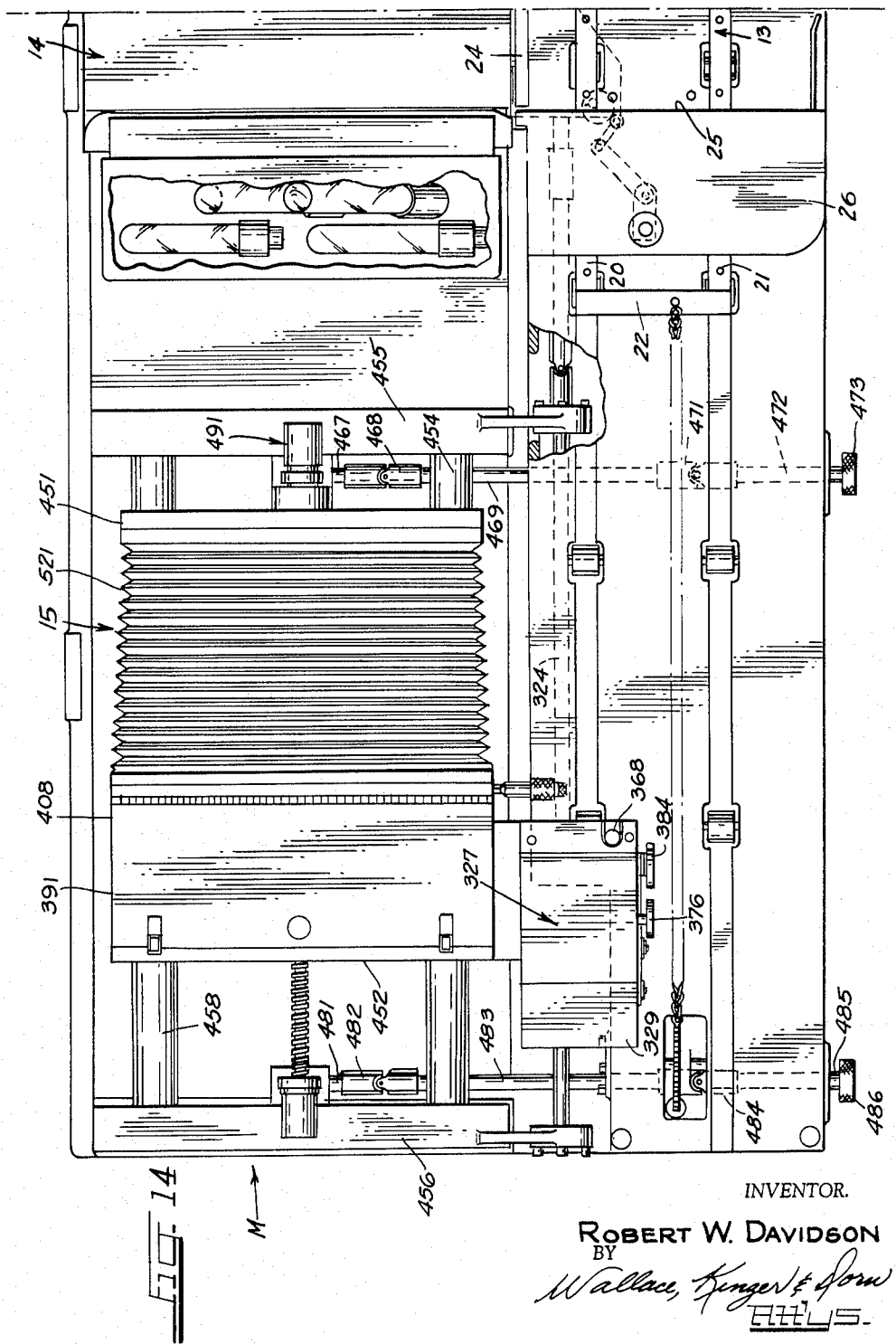

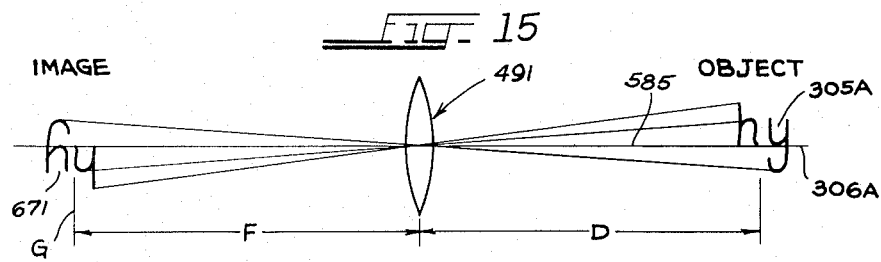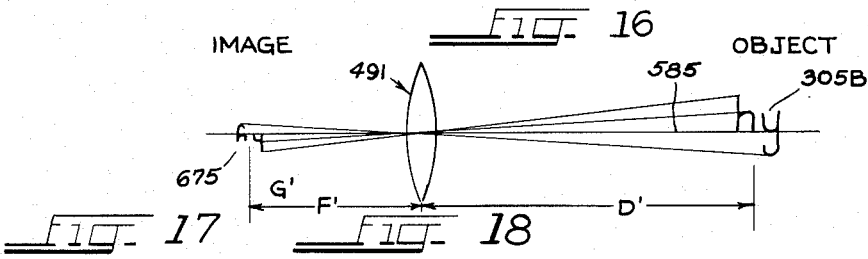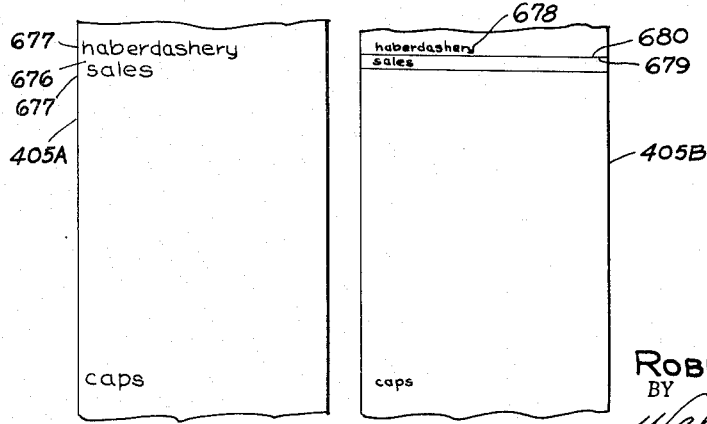

United States Patent Office 3,256,772
Patented June 21, 1966

3,256,772
PHOTOCOMPOSING MACHINE
Robert W. Davidson, Greenwich, Conn., assignor to Varityper Corporation, Newark, N.J., a corporation of Delaware
Original application Apr. 15, 1959, Ser. No. 806,719, now Patent No. 3,079,146, dated Feb. 26, 1963. Divided and this application June 11, 1962, Ser. No. 201,690
7 Claims. (Cl. 88—24)

This invention relates to photocomposing machines and more particularly to camera apparatus for photocomposing machines for use in making up copy from data carried by individual business instruments such as record cards or the like. This is a division of co-pending application Ser. No. 806,719, filed April 15, 1959, now U.S. Patent No. 3,079,146.

The composing of printed matter by photographic processes has been found to afford substantial advantages, as compared with more conventional methods. Photocomposition is particularly advantageous in the make-up of parts lists, directories, and like matter, especially in those instances where it may be desirable to change or revise the content of the printed matter at relatively frequent intervals, although it may be applied to virtually any makeup job. In a photocomposing system, for instance, the individual items for a directory, list, or the like may be printed or otherwise applied to individual business instruments, such as conventional record cards. Usually, one line of data is applied to each record card, although in some instances two or more lines may be carried by each card. In the composing operation, the record cards are individually fed to an exposure station at which they are accurately located with respect to the lens system of a camera. The printed data carried by the cards is photographed, sequentially, upon a strip of film which is fed through the camera synchronously with the feeding of cards to and through the exposure station of the machine.

In a photocomposing machine of the kind with which the present invention is concerned, it is essential that the film upon which the data is composed be advanced through the camera of the machine in precise synchronism with movement of the cards or other business instruments to and through the exposure station of the machine. On the other hand, it is equally important to provide a means to change the length of film which is fed through the camera, during a given operating cycle of the machine, in order that the machine may be adjusted to afford varying spacing between lines of composed matter as well as to accommodate different type sizes in the composed matter. Furthermore, adjustment of the film feed must be accurate and, in a given operational run of the machine, the length of film fed during each operating cycle must be held constant.

An important object of the invention, therefore, is to provide for adjustment of the length of film fed through a photocomposing machine camera during each operating cycle of the machine. A more specific object of the invention is to provide for accurate and effective modification of the length of film fed through the photocomposing machine by adjustment of a single and relatively simple device which comprises a part of the film feed apparatus of the photocomposing machine.

A related object of the invention is to change the length of the film fed through a photocomposing machine, during an operating cycle, without requiring any change or adjustment in the apparatus employed to synchronize the film feed mechanism with the card feeding apparatus of the photocomposing machine.

Another object of the invention is to adjust the length of film fed through a photocomposing machine camera, by an automatic film feed device, without affecting the accuracy and consistency of the film feed mechanism and without introducing any backlash into the film feed mechanism.

Another object of the invention is to provide for convenient loading and unloading of film into a photocomposing machine camera which includes an automatic film feed device.

Another object of the invention is to afford a convenient means for marking the film, at any desired point, in the camera of a photocomposing machine without requiring removal of the film from the camera.

In the photocomposing machine, a focal plane mask may be utilized as an important part of the camera apparatus. This mask must be adjusted to provide an exposure gap which varies in accordance with the size of the data reproduced by the machine. In general, the exposure gap of the mask is an elongated slit betwen two individual mask members, and it is highly important that the spacing betwen these two members be maintained constant throughout the length of the gap. Furthermore, for maximum versatility in the photocomposing machine, it is highly desirable that adjustment of this gap be effected by simple and convenient means, especially where type size, line spacing, and other important aspects of the composed material may vary relatively frequently.

Another object of the invention, therefore, is to provide for simple and convenient adjustment of a focal plane mask for a photocomposing machine. More specifically, it is an object of the invention to provide for adjustment of the focal plane mask, in a photocomposing machine, by means of only two conveniently operable adjusting members, which in the preferred embdiment of the invention, may comprise relatively simple micrometer devices.

An additional object of the invention is to provide for linear adjustment of the gap in a focal plane mask, throughout the length of the gap, over a relatively wide range of mask positions.

A further object of the invention is to afford a simple and easily controlled shutter mechanism suitable for use in a photocomposing machine.

Other and further objects of the present invention will be apparent from the following description and claims and are illustarted in the accompanying drawings which, by way of illustration, show a prefered embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a simplified partly schematic illustration of a photocomposing machine incorporating a camera constructed in accordance with the present invention.

FIG. 2 is a detail perspective view of the camera mechanism of the photocomposing machine;

FIG. 3 is a detail plan view of the film feed drive mechanism for the photocomposing machine, with the cover removed.

FIG. 4 is an elevation view of the film feed drive mechanism, a part of the mechanism having been cut away to show certain operating components;

FIG. 5 is a detail sectional view of the film feed drive taken approximately along line 5—5 in FIG. 4;

FIG. 6 is a detail sectional view of the camera apparatus of the machine, showing the means employed to adjust the lens and image positions of the camera relative to the object;

FIG. 7 is a further detail sectional view of the camera apparatus of the photocomposing machine, showing the raw film magazine and the path followed by the film through the camera to the exposed film magazine;

FIG. 7A is a detail view showing a punch device for marking the film in the photocomposing machine;

FIG. 8 is a partial cut away view of the camera showing details of the film feed rollers and associated devices;

FIG. 9 is a detail view showing the shutter mechanism employed in the photocomposing machine;

FIG. 10 is an elevation view of the focal plane mask apparatus of the photocomposing machine as viewed from the image side thereof;

FIG. 11 is a plan view of the focal plane mask;

FIG. 12 is an end elevation of the focal plane mask taken approximately as indicated by line 12—12 in FIG. 10;

FIG. 13 is a detail sectional view taken approximately along line 13—13 in FIG. 10;

FIG. 14 is a plan view of a major portion of the photocomposing machine, showing the camera apparatus and a part of the card feed mechanism;

FIG. 15 is an explanatory diagram illustrating the optical characteristics of the machine for one location of the lens in relation to the object and image;

FIG. 16 is a further diagram, similar to FIG. 15, which it utilized to explain operation of the machine with the lens in a different location relative to the object and image;

FIG. 17 shows a negative produced by the photocomposing machine, using the lens setting of FIG. 15 and with type of a given size on the record cards fed through the machine; and FIG. 18 shows a negative produced in the same manner as FIG. 17 but with the lens setting illustrated in FIG. 16 and using a different setting of the film feed mechanism.

In FIG. 1 there is illustrated a photocomposing machine M in which data from a series of individual business instruments, such as record cards or the like, are assembled and composed in the form of a negative which may subsequently be utilized in a printing process, as for example in a photolithographic printing application. The photocomposing machine M includes a card magazine 12 in which a relatively large number of individual record cards or other data instruments 13 may be stored. From the card magazine 12, the cards are fed individually to an exposure station 14. At the exposure station, each card is accurately aligned with respect to the lens system of a camera 15. The cards are photographed, in sequence, upon a strip of film fed through the camera 15 in synchronism with the feeding of the cards into aligned position in the exposure station 14. From the exposure station 14, the individual cards 13 are fed to a receiving hopper or stacking mechanism 16 in which they are reassembled in the same order as when they were first placed in the magazine 12.

In the photocomposing machine M, the card storage and feed mechanism comprises a pair of elongated support bars or rails 20 and 21 that are connected together at one end by a cross rail 22. At the opposite end of the support rails 20 and 21 from the cross rail 22, there is mounted a backup plate 23 that is also secured to and supported by the two rails. The rails 20 and 21 extend parallel to a guide member 24. The data instruments 13 are supported on the rails 20 and 21 in vertical position. Means (not shown) are provided, connected to the cross rail 22, for urging the carriage comprising the members 20–23 to the left, as seen in FIG. 1, to bring the lead card in the stack of instruments 13 into engagement with the face plate 25 of a card feed mechanism 26.

A shuttle feed device is mounted in the face plate 25 of the card feed mechanism 26, and this shuttle is utilized cyclically to feed the lead card from the stack 13 into the slot 27 between the two portions 14A and 14B of the exposure station 14. The exposure station 14 includes means, not shown in detail, for interrupting the advancing movement of each card and for aligning the card precisely in a predetermined position in the exposure station. Feeding of the card into and out of the exposure station is completed by a conveyor mechanism illustrated only generally by the conveyor rollers 28.

The camera 15 is provided with a lens system 491 that extends outwardly of a masking apparatus 408. Behind the masking apparatus 408 there is located a film enclosure that includes suitable film magazines and a film feed mechanism 327 that is operated synchronously with the feeding of cards into the slot 27 in the exposure station 14. Thus, a main drive shaft 324 in the photocomposing machine M is utilized to drive the film feed mechanism 327, the card feed mechanism 26, and the conveyor and alignment apparatus at the exposure station 14.

The film feed drive for the photocomposing machine M is best shown in the detail views of FIGS. 2–5, 7 and 8, although some portions of the film feed mechanism are also shown in other figures. As noted hereinabove, the main drive shaft for the film feed mechanism comprises the shaft 324. The film feed mechanism of the photocomposing machine M comprises the adjustable drive apparatus 327 which is best illustrated in FIGS. 3–5. The drive apparatus 327 comprises a housing 328 which is provided with a cover 329, the cover being removed in FIG. 3 to show the interior of the housing. The housing 328 is supported upon the camera unit of the photocomposing machine for movement with the camera in adjustment of the relative positions of the lens and focal plane mask of the camera with respect to the exposure station of the photocomposing machine.

A bracket 331 is mounted upon the base 332 of the housing 328, the lower portion of the bracket 331 being provided with a suitable aperture to receive a first bearing member 333. A second bearing member 334 is journalled within the bearing member 333 and a bevel gear 335 is mounted upon the bearing member 334. The gear 335 is provided with a key which engages in an elongated keyway 336 that extends longitudinally of the shaft 324. This construction permits rotation of the gear 335 in response to rotation of the shaft 324 and at the same time makes it possible to move the gear 335 longitudinally of the drive shaft to virtually any desired position along the shaft.

A second bevel gear 337 is mounted upon a vertical shaft 338 (see FIG. 4) which is journalled in a suitable bearing member 339 supported upon the base 332 of the housing 328. The bevel gear 337 is located in meshing engagement with the bevel gear 335 and therefore is effective to rotate the shaft 338 in response to rotation of the main drive shaft 324. At the end of the shaft 338 opposite the gear 337, another bevel gear 341 is affixed to the shaft 338. The gear 341 is disposed in meshing engagement with a further gear 342 which is mounted upon and affixed to a shaft 343. The shaft 343 extends transversely of the housing 328 and is journalled in suitable bearings mounted in the housing. The gear ratios for the two sets of drive gears are made such that a 1:1 drive ratio is maintained between shafts 324 and 343 in order that the shaft 343 may be driven in exact synchronism with the shaft 324. Each shaft rotates through one full revolution during each operating cycle of the machine. To compensate for possible backlash in the mechanism 327, a brake drum 340 may be mounted on the shaft 343 and is engaged by a brake band 344 having an adjusting screw 350. The brake band 344 also engages a stop pin 361.

An eccentric 345 is affixed to the shaft 343 for rotation therewith and is aligned with a cam follower roller 346 which is mounted upon a lever 347. The lever 347 is pivotally mounted upon a shaft 348 which extends transversely of the housing 328 in substantially parallel relation to the shaft 343. The lever 347 is provided with an extension portion 349 which is pivotally connected to a link 351 as illustrated in FIGS. 3 and 4. The link 351, in turn, is connected to a crank member 352 which comprises the driven member of a first undirectional clutch mechanism 353 that is utilized to control rotational movement of a control shaft 354. A biasing spring 355 is connected to the lever 347 (FIGS. 3, 5) and biases the lever toward clockwise rotation, as seen in FIG. 4, tending to maintain the cam follower roller 346 in engagement with the eccentric 345.

The clutch mechanism 353 may be of substantially conventional construction and is utilized to rotate the shaft 354 in a counterclockwise direction, as seen in FIG. 4, in response to a corresponding movement of the driving member 352 of the clutch. On the other hand, the clutch 353 automatically disengages when the movement of the driving member 352 is reversed. That is, the driving member 352 may be rotated in a clockwise direction without applying any appreciable rotational force to the shaft 354. Any suitable clutch mechanism exhibiting this kind of operating characteristic may be employed. A convenient and effective clutch device for this purpose is the kind conventionally known as a sprag-type clutch. Inasmuch as clutches of this kind are well known in the art, no detailed description or illustration of the clutch mechanism itself is provided herein.

It is necessary to provide for accurate and convenient adjustment of the angular distance through which the shaft 354 is rotated during each operating cycle of the machine. In the illustrated embodiment of the invention, this adjustment is provided by a control device 356 which is supported upon the shaft 354 but which does not rotate with the shaft. The control device 356 comprises a bearing member 357 upon which a stop member 358 is mounted. A gear 359 and a locking member 360 are also mounted upon the bearing member 357, the three control device members 358–360 being connected and affixed to each other by suitable means such as a plurality of screws 362 (see FIGS. 4 and 5). Thus, rotational movement of any one of these members results in a corresponding movement of the others.

The stop member 358 is provided with a stop lug or projection 363 which projects outwardly thereof as best shown in FIGS. 4 and 5. The stop lug 363 is disposed in a path of movement of a corresponding lug 364 which is affixed to and projects from the driving member 352 of the clutch 353. Thus, when the driving member 352 of the clutch rotates in a clockwise direction, as seen in FIG. 4, its rotational movement is limited by engagement of the two lugs 363 and 364. This stop arrangement is utilized to limit the rotational movement of the shaft 354 as expalined more fully hereinafter.

The gear 359 is disposed in meshing engagement with a rack 366. The rack 366 is mounted upon a support member 367 which comprises the shaft of a micrometer 368. The micrometer 368, in turn, is mounted in a suitable boss 369 in a member 371 which constitutes a part of the housing 328. Thus, the vertical position of the rack 366 may be adjusted by adjustment of the setting of the micrometer 368. Moreover, this adjustment also determines the angular positions of the control device members 358–360, since the rack 366 is in meshing engagement with the gear 359. The locking lever 360, on the other hand, is utilized to support a guide member 373 which engages in an arcuate track 374 in one wall of the housing 328. The guide member 373 is provided with a tapped opening for receiving a threaded shaft 375 to which a knob 376 is affixed. Thus, by loosening or tightening the shaft 375 in the guide member 373, using the knob 376, the locking lever 360 may be effectively locked at any desired angular position along the track 374. A biasing spring 377 (FIGS. 3, 5) continuously urges the locking lever 360 toward movement in a counterclockwise direction, as seen in FIG. 4, taking up any slack in the rack-and-gear portion of the device 356.

As noted hereinabove, the clutch 353 provides a driving connection between the drive member 352 of the clutch and the shaft 354 whenever the drive member is rotated in a counterclockwise direction, but is effectively disengaged when the drive member is rotated in a clockwise direction. A second clutch 381 is preferably mounted upon the shaft 354 and is utilized to afford a more positive control and to prevent undesired clockwise movement of the shaft which might result from drag in the clutch 353. The clutch 381 includes an external member 382, which corresponds generally to the drive member 352 of the clutch 353. In this instance, however, the "drive member" of the clutch is affixed to the housing 328. Preferably, a sprag-type clutch or similar device is used as the clutch 382, the clutch being arranged to permit counterclockwise rotation of the shaft 354 but to prevent clockwise rotation of the shaft.

In addition to the mechanically controlled drive arrangement for the shaft 354, it is also desirable to provide for manual operation of this shaft, which is the output shaft of the film feed control device 327. In the illustrated arrangement, the shaft 354 is extended outwardly of the housing 328 and a manual control knob 384 is affixed to the shaft to afford a means for manual rotation of the shaft. At the opposite end, the shaft 354 is also extended outwardly of the housing 328 and a pinion 385 is keyed, pinned, or otherwise affixed to the shaft. The pinion 385 is disposed in meshing engagement with a spur gear 386. The spur gear 386 is suitably mounted upon a shaft 387 which directly controls the film feed of the camera.

The film feeding mechanism of the camera for the photocomposing machine is best illustrated in FIGS. 7 and 8. As shown therein, the camera comprises as substantially light-tight enclosure 391 having a hinged top cover 392 and a hinged back cover 393. The film feed shaft 387 extends transsevesely of the enclosure 391 (see FIG. 8) and is journalled in suitable bearings mounted in the side wall of the enclosure. In FIG. 8, a part of the shaft has been cut away to permit illustration of additional parts of the film feed mechanism. The central portion of the shaft 387 is of enlarged diameter and comprises part of a roller 395 which is covered by a metal sleeve 396 having a layer 397 of rubber or other high friction material on the surface thereof. The film is driven through the enclosure 391 by frictional contact with the high friction layer 397 as described in detail hereinafter.

A raw film magazine 398 is mounted in the upper portion of the camera enclosure 391, as shown in FIG. 7. Essentially, the film magazine 398 comprises a box or container 399 having a mounting flange 401 and having an outlet opening 402. The magazine is removably mounted upon the hinged lid 392 by suitable means, which may comprise a retainer 402 secured to the lid by a screw or other suitable means and engaged in a slot or aperture in the mounting flange 401 of the magazine. In addition, a mounting block 403 may be mounted in the magazine 398 in position to receive a bayonet type or threaded type releasable fastening device 404 which is mounted in the lid 392 of the camera. A reel of unexposed film 405 is disposed within the enclosure 399 of the magazine 398 and may be fed outwardly of the magazine through the opening 402 in the film box.

From the magazine 398, the film 405 is fed over a pair of guide rods 406 and 407 immediately adjacent a focal plane mask structure 408 which is described in detail hereinafter in connection with FIGS. 10–13. From the rod 407, the film 405 passes along a guideway 409 and into contact with the surface 397 of the film feed roller 395. The film is normally maintained in contact with the roller surface 397 by a pressure roller 411. From the pressure roller 411, the film strip passes through a guideway 412 that extends through an opening 413 in the rear wall 393 of the camera, and thence into an exposed film magazine 414 that is removably mounted on the rear wall of the camera.

The pressure roll 411 preferably is a conductive metal roller, mounted on shaft 415, which is effective to prevent a build-up of static charge on the film, which might damage the film emulsion. The shaft 415 is journalled in and supported by a pair of bell cranks 416 located at opposite sides of the camera, only one of the bell cranks being shown in the drawings. The bell cranks 416, in turn, are pivotally mounted upon a stationary shaft 417 which extends transversely of the camera enclosure 391 adjacent the base 418 thereof. Each bell crank 416 includes an arm 419 which extends into alignment with an additional shaft 421, the shaft 421 being journalled in suitable bearings in the sides of the camera unit and being extended through the side walls of the camera to the outside thereof. The shaft 421 is provided at each end with a flattened area or cam surface 422 which is normally engaged by the adjacent bell crank arm 419. The mounting arrangement for the bell crank 416 and the shaft 421 is the same at both sides of the camera. Each of the bell cranks 416 is biased into engagement with the shaft 421 by suitable means such as a biasing spring 440 which is connected to one arm of the bell crank and tends to rotate the bell crank in a clockwise direction as seen in FIG. 7. It should be noted that the shaft 417 which affords a pivotal mounting for the bell cranks supporting the pressure roller 411 is also utilized as a support for the guide 409 in the illustrated embodiment of the invention.

The exposed film magazine 414 is supported upon a pair of brackets 424 which are located at opposite sides of the camera, the magazine being clamped in place by a pair of retainer members 425 (see FIG. 8). The magazine may be relatively simple in construction and may include a central spindle 426 around which the exposed film is wound during operation of the camera. A pair of latching levers 427 are located at opposite sides of the camera and engage additional retainers 428 on the magazine to hold it in the desired operating position (see FIG. 7). One end 429 of the film spindle 426 may be extended outwardly of the magazine 414 to afford a means to connect a take-up drive to the exposed film magazine. Any suitable drive arrangement may be utilized for this purpose; for example, the exposed film magazine spindle may be connected to a pulley 430 on the film feed shaft 387 by a constantly-overdriving connection of the kind conventionally employed in moving picture projectors. Since this particular drive device is not critical to the invention, it has not been shown in detail in the drawings.

The camera of the photocomposing machine also includes a film punch which is shown in detail view of FIG. 7A. The film punch comprises a bar 431 which extends transversely of the camera and which is mounted upon a pair of brackets affixed to opposite sides of the camera housing 391, only one bracket 432 being shown in the drawing. The bar 431 comprises the die member of the film punch. The punch apparatus also includes a punch member 433 which is supported upon and extends through a transverse support member 434, the punch member 433 being aligned with a suitable opening 435 in the die member 431. A spring 436 is utilized to bias the punch member upwardly away from the die member 431 and normally maintains the head portion 437 of the punch member in engagement with a flattened cam surface 438 on a shaft 439. The shaft 439 extends across the camera and is journalled in suitable bearings in the side walls of the camera. One end of the shaft 439 is extended outwardly of the camera housing and a handle (not shown) is affixed to the shaft to provide for actuation of the punch. As indicated in FIG. 7A, the film strip 405 passes between the support member 434 and the die member 431 and thus is positioned to be punched by the punch member 433. In the illlustrated arrangement, the film punch is located immediately ahead of the guide rod 406 for the film.

Operation of the film feed mechanism, and the highly important adjustment features of that mechanism, afford substantial advantages with regard to versatility of the photocomposing machine M as compared with previously known arrangements. The film feeding operation is carried out during the latter part of each operational cycle of the machine, at a time when the shutter of the photocomposing machine is closed. The entire film feeding operation is actuated from the drive shaft 324 which, as noted hereinabove, is operated synchronously with the feeding of record cards into the exposure station of the machine.

The operating position of the film feed control mechanism 327 in FIG. 4 corresponds to the end of the film feeding cycle. Thus, it may be considered that the parts are shown approximately in the position each occupies at the beginning of an operating cycle of the photocomposing machine M. With the shaft 343 set in rotation, in response to the rotational movement of the shaft 324, the eccentric cam 345 is rotated, allowing the cam follower 346 to move to the right and permitting the lever 347 to pivot in a clockwise direction about the shaft 348. The lever 347 is held in engagement with the cam by the spring 355, and thus pivots to the right, as seen in FIG. 4, driving the link 355 to the right and pivoting the clutch drive member 352 in a clockwise direction about the shaft 354. As noted hereinabove, the sprag-type clutch 353 is automatically disengaged for such clockwise movement of the drive member 352; consequently, no more than a very small driving force is applied to the shaft 354 in this portion of the operating cycle of the camera control device 327. Moreover, the second clutch 381 is effective to prevent clockwise rotation of the shaft 354, so that the shaft does not move during this initial portion of the operating cycle. Since it is the shaft 354 which drives the film feed mechanism, the film remains stationary, affording ample time for photographing one of the record cards. The clutch member 352 continues its clockwise movement until the stop member 364 engages the lug 363 to prevent further movement of the clutch drive member. Thus, the members 363 and 364 limit the movement of the clutch drive member 352 and are effective to determine the length of film fed through the camera in a given operating cycle of the photocomposing machine.

As the shaft 343 continues to rotate, during a given operating cycle, it eventually begins to move the cam follower 346, and hence the lever 347, to the left as seen in FIG. 4, pivoting the lever 347 in a counterclockwise direction back toward the initial position shown in the drawing. When this occurs, the link 351 is pulled to the left (FIGS. 3 and 4) and causes the clutch drive member 352 to move in a counterclockwise direction with respect to the shaft 354. The counterclockwise movement of the clutch member 352 causes the clutch 353 to engage and, therefore, drives the shaft 354 in a counterclockwise direction. The angular distance through which the shaft is rotated is, of course, determined by its starting position, established by engagement of the lugs 363 and 364, and is also determined by the configuration of the cam 345. Accordingly, during each operating cycle of the machine, the shaft 354 and the pinion 385 mounted thereon are driven through a predetermined angular distance, in a counterclockwise direction, but clockwise movement of the shaft and pinion are prevented by the second clutch 381.

When the pinion 385 is rotated, as described hereinabove, it drives the film feed shaft 387 and rotates that shaft in a clockwise direction as seen in FIG. 7. Consequently, a predetermined length of the film strip 405 is pulled from the raw film magazine 398, through the opening 402 and over the guide rods 406 and 407 and the guide member 409, and is fed to the exposed film magazine 414 through the guideway 412. Because the roller 395 is provided with the high friction surface 397, and since the film is held in contact with approximately 180° of surface of the roller by means of pressure roller 411, there is virtually no chance of slippage between the film feed roller 395 and the film. Consequently, a uniform length of film is fed through the camera in each operating cycle of the machine, providing uniform and accurate spacing of the exposed areas of the film. This precision and uniformity in operation of the film feed mechanism is extremely important with regard to operation of the photocomposing machine as a whole, since uniformity of appearance in the reproduced copy is entirely dependent thereon.

It may be desirable to adjust the length of the film fed through the camera for a number of different purposes. For example, a greater length of film must be fed through the camera for the reproduction of relatively large type, in the photographed image, to photograph items each including a plurality of lines, or for other purposes. On the other hand, it may be desirable to change the length of the film feed to provide greater or smaller spacing between the lines of reproduced material, or for other purposes. This adjustment of the film feed may be effectively, accurately, and conveniently accomplished by the control device 327 of FIGS. 3–5.

In the drawings the adjustment device 356 is shown adjusted for maximum film feed. To reduce the length of the film feed, the machine operator first releases the locking lever 360 for pivotal movement by unscrewing the knob 376 and releasing it from clamping engagement with the guideway 374. Once this is done, the locking lever, the gear 359 and the stop member 358, are released for pivotal movement relative to the shaft 354, since each is journalled on the shaft and therefore is free to rotate with respect thereto. Thereafter, the operator may adjust the micrometer 368 to move the rod 367, and hence the rack 366, upwardly as seen in FIG. 4. The upward movement of the rack 366 causes the gear 359 to rotate in a counterclockwise direction about the shaft 354 and, accordingly, is effective to rotate both the locking lever 360 and the stop member 358 by a corresponding amount. The spring 377, which maintains a constant counterclockwise bias upon the lever 360, is effective to prevent any ambiguity in adjustment of the position of the rack 366 relative to the gear 359, and assures accuracy of the setting of the control device 356 regardless of the direction in which the rack 366 is moved in reaching an ultimate location. The counterclockwise movement of the elements 358–360 of the control device 356 moves the stop member 363 closer to the lug 364, and therefore reduces the distance through which the clutch drive member 352 is permitted to move in the return movement of the clutch. Thus, the adjustment of the device 356 is effective to limit the angular movement of the drive member of the clutch 353, embodying a corresponding limitation upon rotational movement of the shafts 354 and 387 and thereby limiting the length of film fed through the camera in each operating cycle of the machine. Of course, when the operator has adjusted the micrometer 368 to the desired position the knob 376 is again tightened, locking the film feed adjustment in the desired position.

In some instances, it may be desirable to feed film manually through the camera, as when a space is to be left in the film between succeeding runs of cards relating to different subject matter. To accomplish this purpose, it is only necessary for the operator to interrupt operation of the machine momentarily and turn the shaft 354 in a counterclockwise direction (FIG. 4) by means of the knob 384 (FIG. 5). The sprag-type clutches 353 and 381 do not interfere with manual operation of the shaft.

To install a roll of film in the camera, the operator opens the back 393 of the camera and lifts the lid 392 thereof. With the lid thus accessible, a magazine 398 of unexposed film can be simply and conveniently mounted on the lid 392, using the retainers 402 and 404 as described hereinabove. A leader on the film is pulled from the opening 402 of the magazine and is threaded around the guide rods 406 and 407 and through the guideway 409. A handle 402 (FIGS. 7 and 8) on the shaft 421 is employed to pivot the shaft and disengage the cam portion of the shaft from the cam follower portion 419 of the bell crank 416. Consequently, the bell crank is moved to the position indicated by the dash outline 416A, moving the pressure roller 411 clear of the feed roller 395. When this is done, the operator is able to thread the film 405 between the two rollers 395 and 411. Thereafter, the film can be threaded into the exposed film magazine 414, through the guideway 412, and engaged with the spindle 426. When the threading operation is complete, the handle 420 may be returned to its initial position, permitting the bell crank and the pressure roller to return to their original positions in response to the biasing force exerted by the spring 440. This return movement of the mechanism brings the pressure roller 411 into contact with the film strip and assures good contact of the film strip with both of the rollers 395 and 411. The handle 420 may also be used to release the film and permit manual withdrawal of the film from the camera in the event that this proves to be desirable.

In many instances, it may be desirable to mark predetermined lengths of the film as a guide for development thereof. Thus, if the available development apparatus is limited with respect to the length of the film which may be processed, it may be necessary to mark the film to prevent exposure of an unmanageably long film strip. In other instances, as where the machine is used on relatively short runs or where one group of cards relating to given subject matter is followed by another group relating to different subject matter, it may be desirable to mark the transition between such groups. This is readily and conveniently accomplished by the film punch shown in FIG. 7A. To mark the film, it is only necessary for the operator to rotate the shaft 439, using the lever 441, to force the punch member 433 down through the film strip 405 and into the die member aperture 435. As soon as the handle is returned to its normal position, of course, the punch member is free of the film and the film is again ready to be advanced through the camera. The manual control knob 384 (FIG. 5) may be utilized to advance the film through the camera to bring the punched area past the exposure area intermediate the guide rods 406, 407, after which normal operation of the machine may again be initiated.

The major components of the optical apparatus for the camera 15 of the photocomposing machine are best illustrated in FIGS. 2, 6 and 9–14. As illustrated in FIGS. 6, 7 and 14, the camera comprises a lens mounting member 451 and a film enclosure support member 452. The lens support member 451 is provided with two sets of depending bosses 457 each of the bosses being provided with a suitable aperture for receiving a guide rail 454. The guide rail 454 is mounted in a pair of frame members 455 and 456 which comprise a part of the frame of the photocomposing machine. The frame member 455 is disposed at the right-hand side of the machine, as seen in FIGS. 6 and 14, and extends across the machine in a direction substantially parallel to the path of movement of the record cards through the exposure station 14. The frame member 456 is substantially similar in construction but is located at the left-hand side of the machine as seen in these two figures. A second guide rail 458 is mounted in and extends between the two frame members 455 and 456, being disposed in parallel spaced relation to the guide member 454. The lens mount 451 is also provided with bosses 457 (FIG. 6) having suitable apertures for receiving the second guide member or rail 458. Thus, the lens mount 451 is supported upon the two guide rails 454 and 458 and is longitudinally movable of the guide rails.

The support member 452 for the camera enclosure 391 (see FIG. 7), which may be integral with the base 418 of the camera enclosure, is also provided with a pair of depending bosses 459 which are disposed in encompassing relation to the guide rail 454. The support member 452 is similarly engaged with the second guide rail 458, as by one or more bosses 460 (see FIG. 8) so that this portion of the camera is also mounted upon the two guide rails for sliding movement therealong. As noted hereinabove, the film feed drive apparatus 327 is mounted upon the camera enclosure and thus is also supported for movement toward and away from the exposure station of the photocomposing machine.

The camera apparatus 15 includes means for moving the lens mount 451 and the camera mount 452 toward and away from the exposure station 14 of the photocomposing machine independently of each other. As shown in FIG. 6, the lens mounting member 451 is provided with a bifurcated depending boss or lug 461. A nut 462 is mounted between the two arms of the boss 461 and is threaded onto and supported by a lead screw 463. The lead screw 463 is journalled in suitable bearings in the frame member 455 and in another frame member 464.

At one end of the lead screw 463 there is mounted a spur gear 465, which is affixed to the lead screw and is utilized to rotate the lead screw. The gear 465 is disposed in meshing engagement with a pinion 466 which is pinned, keyed, or otherwise affixed to a transverse shaft 467. As best shown in FIG. 14, the shaft 467 is connected by a universal joint 468 to a second shaft section 469 which, in turn, is connected by a further universal joint 471 to a shaft extension 472. The shaft extension 472 extends outwardly of the frame of the photocomposing machine at one side thereof and is provided with a knob 473. Thus, the lens mounting member 451 may be moved along the guide rails 454 and 458 by turning the knob 473 to rotate the shaft sections 472, 469 and 467, thereby driving the lead screw 463 through the gears 465 and 466.

A similar drive arrangement is provided for adjusting the position of the camera support member 452. Thus, the camera support member is provided with a bifurcated depending boss 475 having a nut 476 positioned between the two arms of the boss (see FIG. 6). The nut 476 is threaded onto a lead screw 477, the opposite ends of the lead screw being mounted in suitable bearings in the frame members 456 and 464. A spur gear 478 is affixed to one end of the lead screw 477 in meshing engagement with a pinion gear 479. The gear 479 is mounted upon a shaft 481 which is extended out to the side of the photocomposing machine by means comprising a universal joint 482, a shaft section 483, a second universal joint 484, and a shaft extension 485. A manual control knob 486 is mounted on the shaft extension 485 and may be utilized to drive the lead screw 477 and thus change the position of the camera mount 452 and the portions of the camera apparatus supported thereon relative to the exposure station of the machine.

The lens system 491 of the photocomposing machine is mounted upon the lens support member 451. The particular lens system employed in the camera is not especially critical in nature and may vary to a considerable extent in its construction. Moreover, the lens system itself may be substantially conventional in construction and operation. Accordingly, a detailed description of the lens construction and operation need not be set forth herein. Preferably, the lens system is provided with means for adjusting the focal conjugates thereof, since the lens position may be changed as described hereinafter.

The shutter for the lens system 491 is also mounted upon the lens support member 451. The shutter mechanism 495 is best illustrated in FIG. 9. As shown therein, the shutter comprises a first shutter member 496 which is pivotally mounted upon a shaft 497, the shaft 497 being supported upon the lens mounting member 451. The shutter member 496 is secured to a lever 498, the other end of the lever 498 being pivotally connected to a link 491. The connecting link 491, in turn, is pivotally connected to a lever 501 which is journalled upon a shaft 502, the lever 501 also being secured to a second shutter member 503. A lever 505 is employed to connect the first shutter member 496 to the armature 506 of a first shutter solenoid 507, sometimes referred to hereinafter as the shutter closing solenoid. A similar arrangement, comprising a lever 508, connects the second shutter member 503 to the armature 509 of a shutter closing solenoid 511.

The shutter 495 illustrated in FIG. 9 is extremely simple in construction yet affords a positive and rapid operation. To close the shutter, the solenoid 507 is energized, moving the armature 506 to the left, as seen in this figure, and pivoting the lever 505 in a clockwise direction about the shaft 497. This pivotal movement of the lever 505 causes a corresponding clockwise rotation of the shutter member 496 and the lever 498, moving the shutter member 496 to its alternate position illustrated by the dash outline 496A, in which the shutter member covers somewhat more than half of the lens opening 513 in the lens mounting member 451. At the same time, the pivotal movement of the lever 498 moves the connecting link 499 longitudinally and causes the lever 501 to pivot in a clockwise direction with respect to the shaft 502. This movement of the lever 501 is effective to move the second shutter member 503 in a clockwise direction about the shaft 502, bringing the shutter member to its closed position, illustrated by the dash outline 503A. Thus, energization of the solenoid 507 is effective to close the two shutter members 496 and 503, bringing the shutter members into overlapping relationship across the lens opening 513.

In operation, the solenoid 507 is energized only for a short period and closes the shutter, but is de-energized before the shutter is opened. To open the shutter, the second solenoid 511 is energized, moving the armature 509 to the right as seen in FIG. 39. This movement of the armature is effective to pivot the lever 508, and hence the shutter member 503, in a counterclockwise direction about the shaft 502, returning these members to their original positions. Moreover, the lever 501 is also pivoted in a counterclockwise direction, moving the link 491 back to its original position and, therefore, pivoting the lever 498 and the shutter member 496 in a counterclockwise direction about the shaft 497. Thus, it is seen that the shutter member 496 is also moved to its original or opened position by energization of the solenoid 511.

A bellows or other adjustable enclosure 521 is included in the camera and extends between the lens mounting member 541 and the camera mounting member 452 (see FIGS. 2 and 14). The end of the bellows opposite the lens mounting member is affixed to a focal plane mask device 408 which, as noted hereinbefore, is mounted at the front or exposure end of the camera enclosure 391. The construction and operation of the focal plane mask device 408 can best be understood by reference to FIGS. 10–13, which illustrate the structural details of a preferred form of mask.

The focal plane mask device 408 comprises a frame member 524 which is affixed to the camera mounting member 452 by suitable means such as a plurality of bolts or the like. As shown in FIG. 10, the frame member 524 is substantially rectangular in configuration and is provided with a relatively large central opening 525. In addition, one face of the frame member is provided with a recess 526, and this same face of the frame member is covered by a face plate 527 having a relatively large central opening 528. The face plate 527 may be secured to the frame member 524 by any suitable means such as plurality of screws 529.

A portion of the face plate 527 is cut away, in FIG. 10, to show the mounting of a first wedge member 531 within the frame 524. As shown therein, the wedge member 531 is disposed in the recess 526 between the face plate 527 and the frame member 524 and engages a pair of bosses 532 in the base of the recessed portion of the frame member. The wedge 531 is employed to control the position of a first mask member 533, which is also of a wedge-like configuration. Thus, the mask member 533 has an inclined edge 534 which is aligned with the inclined edge 535 of the wedge 531, being maintained in a spaced relation with respect thereto by a pair of guide projections or bosses 536 and 537 on the mask member which ride along the edge 535 of the wedge.

A pin 538 is affixed to the wedge 531 and extends outwardly thereof through the central opening in the mask assembly. A biasing spring 539 is affixed to the pin 538, the other end of the spring being secured to a pin 541 mounted on the face plate 527. Thus, the spring 539 is effective to apply a continuous biasing force to the wedge 531 tending to move the wedge to the right as seen in FIG. 10.

A micrometer 543 is mounted upon a frame member 534 with the shaft 544 of the micrometer extending through a suitable aperture in the frame member and into a slot 545 in the right-hand face of the wedge 531 as seen in FIG. 10. The end of the shaft 544 engages a stop member 546 which is affixed to the wedge and which is located at the base of the slot 545. In FIG. 10, the micrometer 543 is illustrated at one extreme position of its adjustment range with the shaft 544 advanced as far to the left as possible. From this position, the micrometer shaft 544 may be withdrawn by adjustment of the micrometer, permitting the wedge 531 to move to the right, thereby adjusting one side of the mask, as described more fully hereinafter.

The focal plane mask device 408 further includes a second wedge member 551 which is substantially similar to the wedge 531 but is located at the opposite side of the device. The wedge 551 is also disposed in the recess 526 between the frame member 524 and the face plate 527 and engages a pair of bosses 552 in the base of the recess. The wedge 551 is employed as a guide for a second mask member 553, which is provided with a pair of bosses 556 and 557 on the inclined face 554 thereof; the bosses 556 and 557 engage the inclined face 555 of the wedge 551. The wedge 551 is provided with a biasing spring 559 which extends between a pin 558 on the wedge and a second pin 561 affixed to the face plate of the mask device.

A micrometer 563, substantially similar to the micrometer 543, is mounted at the right-hand side of the mask assembly as seen in FIG. 10, with the micrometer shaft 564 extending through a suitable aperture in the frame member 524 and into a slot 565 in the wedge 551. At the base of the slot 565 there is mounted a stop member 566 which engages the end of the shaft 564. Thus, the micrometer 563 and the spring 559 may be utilized to adjust the position of the wedge 551 within the mask assembly in substantially the same manner as described hereinabove with respect to the wedge 531.

For effective operation of the mask assembly 408, it is necessary to provide some means for maintaining the two mask members 533 and 553 in engagement with the edges 531 and 551, respectively. In the illustrated arrangement, this means comprises two pair of compression springs 571 and 572 which are effectively interposed between the two mask members 533 and 553 and which tend to force the mask members away from each other and toward their associated wedge members. The mounting arrangement for the compression springs 572 is shown in detail in FIG. 12. As illustrated therein, a first double-ended bracket 573 is affixed to the mask member 533, and a second similar double-ended bracket 574 is affixed to the other mask 553. The springs 572 are interposed between the two brackets, on opposite sides of the mask members, and are held in position by suitable means such as relatively small pins affixed to the brackets and extending into the springs. A corresponding mounting arrangement, comprising a pair of brackets 575 and 576 (see FIG. 10) is employed in the opposite side of the mask to afford a mounting arrangement for the springs 571. It is thus seen that the springs 571 and 572 are effective to retain the two mask members in positive engagement with their associated wedges, so that the position of each mask member is positively determined by its associated wedge.

The masks 533 and 553 are utilized to adjust the effective width of the exposed area on the film as it is fed through the camera of the photocomposing machine. Consequently, it is essential that the mask be located immediately adjacent the focal plane of the camera and that the film, in its exposure position, be located immediately the mask. This relationship is illustrated in FIGS. 10, 12 and 13. As shown therein, the two guide rods 406 and 407 for the film strip 405 are mounted upon the frame 524 of the focal plane mask. Moreover, the guide rods are so located that the film strip is guided along a path immediately adjacent the two mask members 533 and 553, so that the film is essentially co-planar with the mask at the exposure point 581. Furthermore, the two mask members are each preferably provided with a longitudinal recess immediately adjacent their mating edges, as shown by the recesses 582 and 583 in the mask members 533 and 553 respectively (FIG. 13). This recessed-edge construction is highly advantageous in avoiding collection of dust particles along the edges of the mask, thereby preventing the formation of extraneous unexposed areas in the film which might otherwise be caused by the collection of dust particles in this area.

To adjust the focal plane mask device 408 for a given run of the photocomposing machine M, it may be necessary for the operator to adjust either one or both of the two micrometers 543 and 563. To adjust the mask in one direction, the micrometer 543 is adjusted, moving the shaft 544 to the right and permitting the wedge 531 to move to the right in response to the force exerted by the spring 539 (see FIG. 10). When the wedge 531 moves to the right, the mask 533 moves downwardly in response to the biasing force exerted by the springs 571 and 572. This adjustment does not, however, make any change in the position of the mask 533, which is held in contact with its controlling wedge 551. Accordingly, the extent or height of the mask aperture 581 below the base line or axis 585 of the lens system is adjusted by the micrometer 543 independently of any adjustment of the aperture above the base line.

To open up the mask above the lens axis 585, the machine operator adjusts the micrometer 563 to move the micrometer shaft 564 to the right, as seen in FIG. 10, away from the stop 566. When this is done, the spring 559 pulls the wedge 551 to the right, permitting the mask 553 to move upwardly away from the mask 533 and away from the lens axis 585. Of course, this operation has no effect upon position of the lower mask 533. Accordingly, it is seen that the focal plane mask assembly 408 provides for completely independent adjustment of the two masks 533 and 553 with respect to the lens axis 585, permitting the achievement of a wide variety of effects in the material composed by the photocomposing machine.

In considering operation of the optical system of the photocomposing machine, attention should be directed to FIGS. 15–18 in addition to the various views of the machine discussed hereinabove. FIG. 15 is a schematic view illustrating operation of the optical system in an application in which the object data 305A is to be photographed with no substantial change in size. The record card or other business instrument upon which the object data is carried is located in the exposure station of the machine with the base line 306A for the data preferably located in substantial coincidence with the axis 585 of the lens system 491, the lens system being illustrated schematically, in this view, as a single lens. To achieve 1:1 reproduction, the positioning knob 473 (FIG. 14) is adjusted to provide a lens distance, or conjugate D, from the object data 305A. The lens system 491 is adjusted to provide an image conjugate distance F which is approximately equal to the distance D. Furthermore, the adjusting knob 486 (FIG. 14) is adjusted to bring the mask device 408 into a position in which the mask elements 533 and 553 are located approximately in the focal plane G of the lens system, thereby positioning the film strip 405 in the focal plane of the lens (see FIGS. 13 and 15). Under these conditions, and as illustrated in FIG. 15, the data 671 is reproduced on the film strip without change in size from the original data 305A.

FIG. 16 is a schematic illustration of the lens system arranged for reproduction of an image of half the normal size of the object data 305B. In this instance, the lens system 491 is adjusted to a given object conjugate distance D′ from the object data and the image conjugate distance F′ of the lens system is made equal to half the distance D′. The position of the film box and the mask assembly is also adjusted to bring the mask, and thus the film exposure point, into substantial coincidence with the focal plane G′ of the lens at the distance F′ from the optical center of the lens. Under these circumstances, the reproduced image 675 is half the size of the original data 305B. Of course, further reductions in size may be effected by further increasing the spacing between the lens and the object relative to the focal length of the lens. Moreover, virtually any size intermediate those illustrated in FIGS. 15 and 16 may be obtained by adjustment of the lens and film units of the camera relative to the object plane in the exposure station 14 (FIG. 14).

By making the lens system adjustable in this manner it is possible to effect a number of different variations in the size of the reproduced image, relative to the object data, which would not be possible if the lens and film units were in a fixed position.

FIG. 17 shows a typical example of a film strip produced by the photocomposing machine, using a given line spacing and a given reproduction size ratio. Thus, it may be assumed that FIG. 17 represents a negative produced using the lens and focal plane adjustment of FIG. 15 and with a given adjustment of the film feed and the mask of the photocomposing machine. The film strip 405A shown in this figure is illustrated as a positive, for convenience in the drawings, but would, of course, be a negative image. To assure complete exposure and to avoid discontinuities in the intervening areas 676 between individual lines 677 of the reproduced data, the mask 408 is preferably adjusted to provide for a relatively small double exposure area between adjacent lines data. This is accomplished by adjusting the mask to afford an exposure gap 581 (see FIG. 13) having a height which is slightly larger than the incremental length of film fed through the camera during each operating cycle of the machine. This arrangement is of substantial advantage in providing clean, uncluttered copy and avoids any tendency toward undesired lines or spotting between the individual lines of data 677.

FIG. 18, on the other hand, shows another section of film strip 405B, reproduced from the same object cards as the strip 405A of FIG. 17 but with a different adjustment of the lens and camera positions, such as descirbed in connection with FIG. 16. Thus, the reproduced data lines 678 on the film strip 405B comprise letters which are approximately half the size of those of the lines 677 of FIG. 17. However, it is not essential that the spacing between the lines 678 be equal to or bear any particular relation to the spacing 676 between lines in the first described film strip. Instead, the individual spaces 679 between the lines of data 678 may be adjusted entirely independently of the size of the reproduced image, so long as overlapping between adjacent image lines is avoided. Moreover, it is also possible to adjust the mask 408 to provide for a thin unexposed strip or line 680 running through each of the spaces 679 between adjacent lines of data. This is accomplished by adjusting the mask to make the exposure gap 581 slightly smaller in height than the length of film which is fed through the camera in each operating cycle of the machine. Thus, the film strip 405B may be utilized in producing ruled forms automatically without requiring any ruling on the original data applied to the record cards or similar carriers. It is thus seen that the multiple adjustments afforded by the photocomposing machine, comprising the adjustment for the length of film fed, the mask adjustment, and the adjustments for the lens and mask positions relative to the object data make it possible to achieve almost any desired reproduction effect in regard to the size, spacing, and other factors in the reproduced image.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A camera for a photocomposing machine of the kind in which record cards or like business instruments, each bearing data to be included in a composition, are individually fed from a storage magazine to an exposure station at which said data are photographed upon a film strip moved step-by-step through the camera in synchronism with movement of said record cards into said exposure station, said camera comprising: a film feed drive shaft; a unidirectional clutch device, including a driving member, for rotating said shaft in a film feeding direction but freely rotatable with respect to said shaft in the return direction; a first stop member affixed to said clutch drive member for rotation therewith; a second stop member, positioned in the path of movement of said first stop member, for engaging said first stop member to limit return movement of said first stop member and said clutch drive member; and means for adjusting the position of said second stop member to change the length of return movement of said clutch drive member and thereby adjust the length of film fed on the next film-feeding movement of said drive member, said means comprising an axially movable adjustably fixed positioning shaft, gear means connected to said second stop member, and biasing means urging said gear means toward engagement with said adjusting shaft.

2. A camera for a photocomposing machine of the kind in which record cards or like business instruments, each bearing data to be included in a composition, are individually fed from a storage magazine to an exposure station at which said data are photographed upon a film strip moved step-by-step through the camera in synchronism with movement of said record cards into said exposure station, said camera comprising: a film feed drive shaft; a first unidirectional clutch device, including a driven member affixed to said shaft and a driving member engageable with said driven member to rotate said shaft in a film feeding direction but freely rotatable with respect to said driven member in the return direction; a second unidirectional clutch device, mounted on said shaft, for preventing rotation of said shaft in said return direction; a first stop member affixed to said clutch drive member for rotation therewith; a second stop member, positioned in the path of movement of said first stop member, for engaging said first stop member to limit return movement of said first stop member and said clutch drive member; and means for adjusting the position of said second stop member to change the length of return movement of said clutch drive member, said means comprising an axially movable adjustably fixed positioning shaft, gear means connected to said second stop member, biasing means urging said gear means toward engagement with said adjusting shaft, and locking means for maintaining said second stop member in adjusted position.

3. A camera for a photocomposing machine of the kind in which record cards or like business instruments, each bearing data to be included in a composition, are individually fed from a storage magazine to an exposure station at which said data are photographed upon a film strip moved step-by-step through the camera in synchronism with movement of said record cards into said exposure station, said camera comprising: a film feed drive shaft; a unidirectional clutch device, including a driven member affixed to said shaft and a driving member engageable with said driven member to rotate said shaft in a film feeding direction but freely rotatable with respect to said driven member in the return direction; a first stop member affixed to said clutch drive member for rotation therewith; a second stop member, rotatably mounted on said shaft and positioned in the path of movement of said first stop member, for engaging said first stop member to limit return movement of said first stop member and said clutch drive member; and means for adjusting the position of said second stop member to change the length of return movement of said clutch drive member and thereby adjust the length of film fed during film-feeding movement of said drive member, said means comprising an axially movable adjustably fixed positioning shaft, a spur gear connected to said second stop member for rotation therewith, a rack disposed in meshing engagement with said spur gear and having one end abutting said adjusting shaft, a locking lever connected to said spur gear for rotation therewith, and spring means for biasing said gears to maintain said rack in contact with said adjusting shaft.

4. A camera for a photocomposing machine of the kind in which record cards or like business instruments, each bearing data to be included in a composition, are individually fed from a storage magazine to an exposure station at which said data are photographed upon a film strip moved step-by-step through the camera in synchronism with movement of said record cards into said exposure station, said camera comprising: a film feed drive shaft; a unidirectional clutch device, including a driven member affixed to said shaft and a driving member engageable with said driven member to rotate said shaft in a film feeding direction but freely rotatable with respect to said driven member in the return direction; a first stop member affixed to said clutch drive member for rotation therewith; a second stop member, positioned in the path of movement of said first stop member, for engaging said first stop member to limit return movement of said first stop member and said clutch drive member; and means for adjusting the position of said second stop member to change the length of return movement of said clutch drive member, said means comprising an axially movable adjustably fixed positioning shaft, a micrometer for adjusting the position of said shaft, gear means comprising a spur gear connected to said second stop member for rotation therewith, and biasing means urging said gear means toward engagement with said adjusting shaft.

5. A camera for a photocomposing machine of the kind in which record cards or like business instruments, each bearing data to be included in a composition, are individually fed from a storage magazine to an exposure station at which said data are photographed upon a film strip moved step-by-step through a camera in synchronism with movement of said record cards into said exposure station, said camera comprising: a film feed drive shaft connected in driving relation to a film feed roll; a unidirectional clutch device, including a driving member, for rotating said shaft in a film feeding direction but freely rotatable with respect to said shaft in the return direction; stop means, including an adjustable stop member, for limiting return movement of said clutch drive member; and means for adjusting the position of said stop member to change the length of return movement of said clutch drive member and thereby adjust the length of film fed during film feeding rotational movement of said drive member.

6. A camera for a photocomposing machine of the kind in which record cards or like business instruments, each bearing data to be included in a composition, are individually fed from a storage magazine to an exposure station at which said data are photographed upon a film strip moved step-by-step through the camera in synchronism with movement of said record cards into said exposure station, said camera comprising: a film feed drive shaft; a unidirectional clutch device, including a driving member, for rotating said drive shaft in a film feeding direction but freely rotatable with respect to said drive shaft in the return direction; a control shaft; an eccentric mounted on said control shaft for rotation therewith; a drive linkage connecting said clutch drive member to said control shaft, and including a cam follower engaged with said eccentric, for rotating said clutch drive member in a film feeding direction and in the return direction during each revolution of said eccentric; stop means, including an adjustable stop member, for limiting return movement of said clutch drive member; means for rotating said shaft through one revolution during each cycle in which a record card is fed to said exposure station; and mean for adjusting the position of said second stop member to change the length of return movement of said clutch drive member and thereby adjust the length of film fed during each revolution of said control shaft.

7. A camera for a photocomposing machine of the kind in which record cards or like business instruments, each bearing data to be included in a composition, are individually fed from a storage magazine to an exposure station at which said data are photographed upon a film strip, said camera comprising: a substantially light-tight enclosure including a pair of hinged closure members, one wall of said enclosure comprising an adjustable focal plane mask affording an exposure opening; a pair of film magazines removably mounted on respective ones of said closure members; a pair of guide members mounted immediately adjacent said focal plane mask on opposite sides of said exposure opening and adapted to guide the film strip in a predetermined plane; said focal plane mask being located immediately adjacent the plane for the film and essentially in co-planar relationship thereto at the exposure opening; a film feed roll extending parallel to said guide members and spaced therefrom; a film feed drive shaft, connected to said film feed roll; a unidirectional clutch device, including a driving member, for rotating said shaft in a film feeding direction but freely rotatable with respect to said shaft in the return direction; a first stop member affixed to said clutch drive member for rotation therewith; a second stop member, positioned in the path of movement of said first stop member, for engaging said first stop member to limit return movement of said first stop member and said clutch drive member; and means for adjusting the position of said second stop member to change the length of return movement of said clutch drive member and thereby adjust the length of film fed on the next film-feeding movement of said drive member, said means comprising an axially movable adjustably fixed positioning shaft, gear means connected to said second stop member, and biasing means urging said gear means toward engagement with said adjusting shaft.

References Cited by the Examiner

UNITED STATES PATENTS

| | | | |
|---|---|---|---|
| 1,935,210 | 11/1933 | Hopkins | 95—34 |
| 2,099,681 | 11/1937 | Draeger | 95—31 |
| 2,421,746 | 6/1947 | Duffy | 95—36 |
| 2,496,329 | 2/1950 | Briechle et al. | 95—31 |
| 2,592,735 | 4/1952 | Pirmov | 88—24 |
| 2,616,331 | 11/1952 | Pavelle | 88—24 |
| 2,706,435 | 4/1955 | Gerken | 95—36 |
| 2,716,929 | 9/1955 | Smith | 95—34 |
| 2,849,916 | 9/1958 | Nolan | 88—24 |
| 2,968,992 | 1/1961 | Billet | 88—24 |

NORTON ANSHER, *Primary Examiner.*

EMIL G. ANDERSON, *Examiner.*

RICHARD WINTERCORN, *Assistant Examiner.*